Patented Jan. 13, 1931

1,788,748

UNITED STATES PATENT OFFICE

AUGUST E. SCHUTTE, OF NORTHBORO, MASSACHUSETTS

METHOD OF MAKING CONCRETE PILES

No Drawing.   Application filed March 7, 1928.   Serial No. 259,931.

This invention relates to piles and similar structures which are subjected to the action of moisture and especially to the action of sea-water, which as is well known has a deteriorating effect upon concrete structures.

More specifically the invention relates to a method of protecting structures of whatsoever shape against sea-water by surrounding such structures with a protective coating of water-resisting material such as asphalt.

The present method has for its object the production of a body or mass to be used in the formation of the structure or as a coating or surface finish, wherein the water-proofing material, such as asphalt, is mixed with a fluid admixture containing cement prior to the setting or hardening thereof, whereby a body having a cellular, reticular or void containing formation embodying or holding asphalt is produced.

I am aware that various methods have heretofore been employed for impregnating various structures, including among others piles, and further that such structures have been provided with protective coatings of asphalt and the like. But in all these structures, the cellular, reticular and void-containing area are always produced prior to the saturation and impregnation with asphalt. In other words, a hard concrete structure, a structure in which the Portland cement has set, has been first produced and in order to impregnate the same with an asphaltum which is hard enough at normal temperature to be retained by the voids, the structures had to be either pre-heated or heated during saturation.

The heating of such structures is not only expensive but is also dangerous from the standpoint of good results. It is practically impossible to heat structures such as piles, which may be 75 feet long or more and two or more feet in diameter, without rupture. The expansion of the structure will cause superficial cracks and fissures, if not large longitudinal cracks thus rendering the pile almost useless by creating a possibility of the water being admitted to the interior and only partially saturated section, causing the disintegration of the structure and the rusting of the reinforcement.

By the improved method, which is the subject of this application, the cellular body or the surrounding cellular asphalt carrying-layer is not formed previous to the saturation with asphalt but is formed simultaneously so that upon hardening a structure having a fine cellular formation containing asphalt in a finely divided form is produced.

I have discovered that if a heated bitumen such as asphalt which is normally hard enough to stay in the pores of a cement structure at normal temperature, is heated and if it is mixed with a Portland cement grout which is also heated, an intimate mixture is produced. The fineness of this mixture depends entirely upon the degree of agitation and the temperature employed and also upon the percentage of the asphalt used to the Portland cement. If after the hot bitumen has been added to the cement the mixture has only been slightly agitated, a structure will be formed in which relatively coarse particles of asphaltum are surrounded and included in a mass of the cement. If the agitation is continued longer and the temperature raised, a finer mixture will be arrived at. This can be continued until almost an emulsion is obtained. In all these cases, a reticular body of Portland cement is produced in which asphaltum particles are held and dispersed.

To surround a concrete structure with such a coating is an easy matter,—it being both expeditious as well as economical. Large structures do not have to be handled, preheated, heated or treated in any elaborate way,—all that is necessary is to form the concrete core, with its reinforcement, smaller to the extent of the coating required and then apply the Portland-cement-asphalt protective mixture, whereupon the structure is allowed to "set" and cure.

There are obviously many ways to apply this layer or mixture as, for instance, through the use of a cement gun, trowelling, or placing the structure in a form or mould spaced therefrom and then filling the form with the coating or outer layer forming material.

After having acquired the necessary strength, the pile is removed from its mould and is superficially heated so as to produce a continuous bituminous surface. The heating will melt the asphalt in the superficial voids, cause it to exude and coalesce, thereby forming an absolutely impervious coating. The cement structure forming the core and the structure forming the protective coating will unite perfectly as wet cement will adhere without any trouble to wet cement. It is obvious that sand in desired proportions can be added to the protective coating.

The advantages of the method of construction as well as the superior product are obvious. The concrete structure itself can be made as dense as possible, as no porosity is required to aid impregnation and hold the asphalt. No large and expensive plants are required or systems of impregnation. All that is necessary is the ordinary moulds, the ordinary concrete mixer and an asphalt heating tank. Piles can be constructed in situ in the place where they are to be used, thus avoiding cost of transportation, breakage, etc., necessary if they are treated at a central impregnating plant.

What is claimed is:

1. A method of constructing a concrete pile by first forming the pile, surrounding it with an adherent coating before setting with a mixture of a "grout" of Portland cement, and asphalt.

2. A method of producing a concrete pile, by first forming a pile, surrounding the pile with an adherent coating consisting of a mixture of water, Portland cement, and asphalt, allowing the pile to set until hard, then heating the pile superficially causing the asphalt to coalesce and unite, forming an impervious coating.

3. A method of producing a pile, which consists in placing in a mould the ordinary concrete mixture composed of stone, sand and cement, to form the interior part of the pile and a special coating mixture surrounding the interior part composed of Portland cement grout, and hot bitumen, and allowing the mixture to set.

In testimony whereof I have signed my name to this specification.

AUGUST E. SCHUTTE.